United States Patent [19]

Flemmi

[11] 4,119,212
[45] Oct. 10, 1978

[54] MONITORING THE LOCATION OF A ROBOT HAND

[75] Inventor: John Peter Wilfred Flemming, Hopewell Township, Mercer County, N.J.

[73] Assignee: Western Electric Company, Inc., New York, N.Y.

[21] Appl. No.: 816,762

[22] Filed: Jul. 18, 1977

[51] Int. Cl.² .............................................. B65G 47/90
[52] U.S. Cl. ................................ 214/1 CM; 33/1 N; 73/1 E; 212/39 A; 214/1 BD; 214/152; 214/761
[58] Field of Search ............... 214/1 B, 1 BS, 1 BC, 214/1 BH, 1 BV, 1 BD, 1 CM, 1 R, 761, 762, 763, 764, 779.2, 152; 340/267 C; 212/2, 39 A, 39 MS; 37/DIG. 19; 73/1 E, 65; 33/1 N, 1 PT; 364/815-818

[56] References Cited

U.S. PATENT DOCUMENTS

| 2,517,582 | 8/1950 | Lull | 214/761 |
| 3,346,724 | 10/1967 | Fuhrmeister et al. | 364/731 |
| 3,589,134 | 6/1971 | Hackmann et al. | 214/1 CM X |
| 3,819,922 | 6/1974 | Horn et al. | 212/39 A X |
| 3,943,343 | 3/1976 | Irie | 214/1 CM X |
| 3,997,071 | 12/1976 | Teach | 214/761 |

FOREIGN PATENT DOCUMENTS 1,360,128  7/1974  United Kingdom ............... 212/39 MS Primary Examiner—Frank E. Werner
Attorney, Agent, or Firm—A. S. Rosen

[57] ABSTRACT

A robot arm, comprising a pair of arm elements interconnected by a pivotal joint, includes a hand for supporting an article. Two additional linking elements of known lengths, interconnected by a free-floating pivotal joint, are pivotally coupled, at the free end of one linking element to the hand of the robot arm, and at the free end of the other linking element to a known position. Sensing devices at the free-floating pivotal joint and at the known position monitor, respectively, the angle between the linking elements and the attitude of such other linking element at the known position, in order to determine the location of the hand and, thus, of an article supported therein. Since the linking elements are not load-bearing, the determination is independent of any load on the hand such as may deform the arm elements.

8 Claims, 4 Drawing Figures

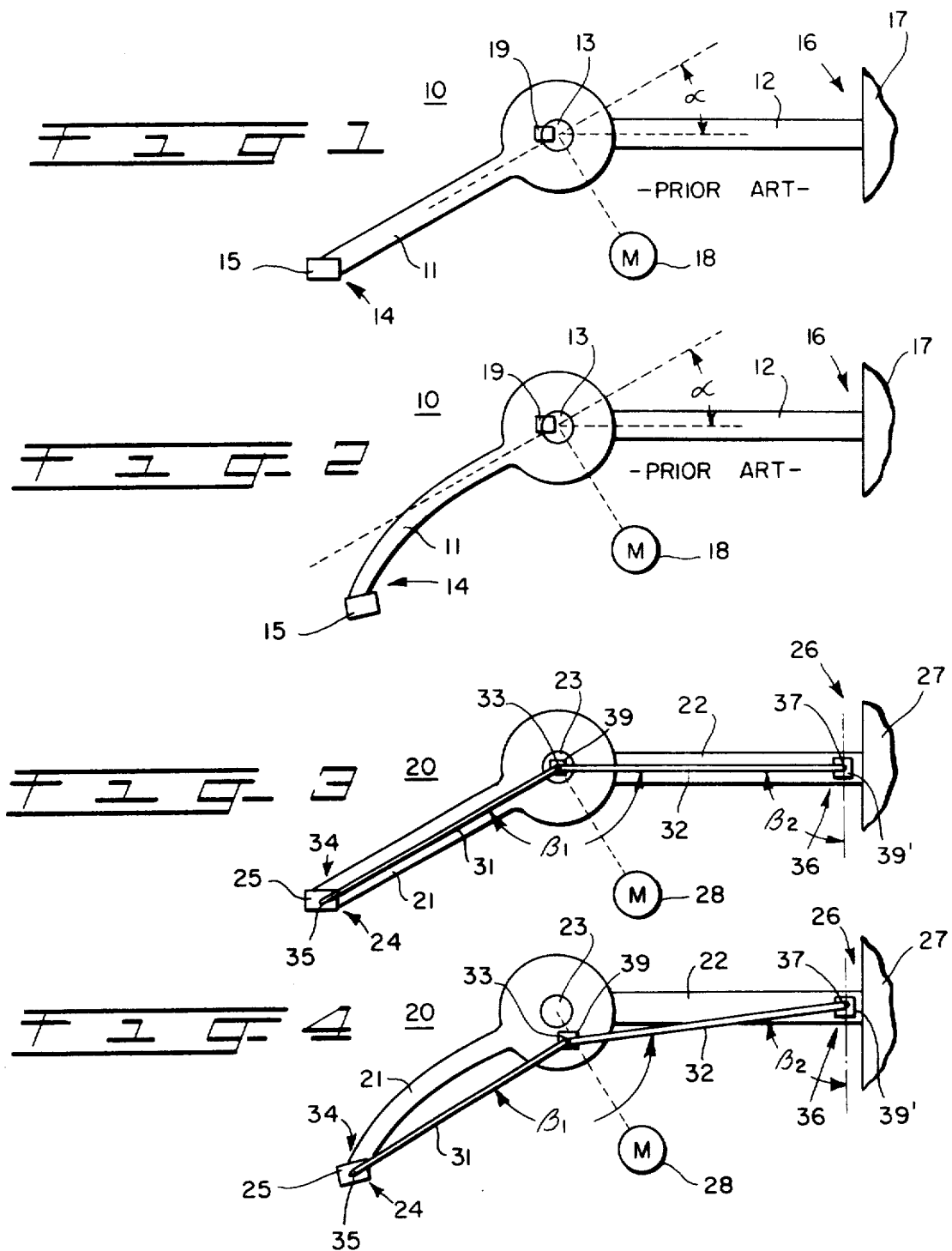

MONITORING THE LOCATION OF A ROBOT HAND

BACKGROUND OF THE INVENTION

1. Field of the Invention

The invention relates to the handling of an article by means of a robot arm and, more particularly, to the handling of an article by means of a hand of a robot arm while monitoring the location of the hand in order to know the location of the article being handled.

2. Description of the Prior Art

The handling of articles by means of robot arm devices is known. A typical robot arm may include one or more arm elements, e.g., two such arm elements, interconnected by pivotal joints, with the robot arm terminating at one of its ends in a "hand" for supporting an article, and with the robot arm being mounted at its other end, such that the hand may be manipulated between desired positions of the article. Suitable manipulating means for operating the robot arm to move the hand between the desired positions of the article, and suitable control mechanisms, which may be computer-operated, are generally associated with such a robot arm.

In order to control the movements of the robot hand, it is necessary, of course, for the control mechanisms to be informed as to the location of the robot hand at all times. Previously, tracking or monitoring of the position of the robot hand has been accomplished by means of sensors, located at each pivotal joint, for indicating the angle between adjacent arm elements at such pivotal joint. Since the length of each arm element is known, a vector summing operation is relied upon to determine the location of the robot hand and, thus, of the article.

The prior art, robot hand monitoring technique just described presupposes that there is, at most, only a negligible deformation of the set of interconnected arm elements. Any deformation, if more than negligible, would render inaccurate the location determined for the robot hand on the basis of the vector summing operation. The use of the robot hand as an article-supporting and manipulating facility, however, causes the weight of the article to impose a load on each arm element, providing a bending moment which increases with increasing distance of the hand from the arm mounting position during movement of the supported article, and which tends to deform the robot arm configuration. Other loads imposed upon the robot hand, e.g., due to contact of the supported article or the hand with another object, will also tend to deform the arm. Thus, the employment of robot arms has generally been restricted to the handling of only very small and light articles, to operations in which precise article positioning is not important, and/or to usages involving massive robot arm structures, e.g., large castings, for supporting large loads without significant deformation. Any such massive robot arm structures are, of course, relatively costly to produce, manipulate and control, as compared with the relatively light structures which could be employed were not load-caused deformation of the arm elements a source of inaccuracies in the hand location monitoring technique.

Accordingly, it would clearly be advantageous to provide a technique for monitoring the location of a robot hand, in order to know the location of article supported in the hand, wherein the accuracy of the technique is unaffected by any deformation of the robot arm which includes the hand.

SUMMARY OF THE INVENTION

The invention contemplates new and improved methods and apparatus for handling an article by means of a robot arm, which arm terminates at one end thereof in a hand while being mounted at the other end thereof, and simultaneously monitoring the location of the article being handled. The article is supported in the hand of the robot arm, with a load from the article supported in the hand, e.g., the weight of the article, tending to cause deformation of the robot arm. A plurality of linking elements of known lengths is also provided, for example, two such linking elements, the linking elements being interconnected. One of the linking elements is pivotally coupled at a free end thereof to the hand of the robot arm, and another of the linking elements is pivotally coupled at a free end thereof to a known position. The linking elements are free of any load from the article and, thus, not subject to load-caused deformation. By measuring both the relationship between adjacent interconnected linking elements and the attitude of the previously mentioned other linking element at the known position, the location of the article supported in the hand of the robot arm may be determined, e.g., by a vector summing operation.

BRIEF DESCRIPTION OF THE DRAWING

FIG. 1 of the drawing is a schematic illustration of a prior art, robot arm device in an unloaded, undeformed condition;

FIG. 2 is a schematic illustration of the prior art, robot arm device of FIG. 1 in a loaded, deformed condition;

FIG. 3 is a schematic illustration of a robot arm device, including a pair of interconnected linking elements provided in accordance with the principles of the invention, the robot arm being in an unloaded, undeformed condition; and FIG. 4 is a schematic illustration of the robot arm device of FIG. 3 in a loaded, deformed condition, the interconnecting linking elements remaining unloaded and, thus, undeformed.

DETAILED DESCRIPTION

Referring initially to FIG. 1 of the drawing, a prior art, robot arm device 10 is illustrated schematically. The robot arm 10 is composed of a first arm element 11, of known length, and a second arm element 12, also of known length, which are interconnected at one end of each arm element 11 or 12 by a pivotal joint 13. The first arm element 11 terminates at its free end 14 in a hand 15 for supporting an article, while the second arm element 12 is mounted at its free end 16, i.e., at the end 16 of second arm element 12 remote from the pivotal joint 13, e.g., on a frame or wall structure 17, such that the position of the free end 16 of second arm element 12 is known. A motor 18 may be employed to manipulate the robot arm 10 so as to vary the position of the hand 15.

In order to determine the location of the hand 15, e.g., so as to control the position of a workpiece being repositioned by the robot arm 10, a sensor device or encoder 19 is employed. The encoder 19, which may be a conventional potentiometer, is mounted at the pivotal joint 13, and serves to measure an angle α between the two arm elements 11 and 12 at the pivotal joint 13. Since the arm elements 11 and 12 both have known lengths, the prior art technique utilizes information as to the value of the angle α in order to determine the location of the hand 15 by performing a routine vector summing operation.

Turning now to FIG. 2 of the drawing, the effect of a load upon the hand 15, e.g., due to the weight of an article supported by the hand 15, may be seen. One or both of the arm elements 11 and 12 will tend to bend or deform under the load. Thus, the measurement of the angle α and the knowledge of the lengths of the arm elements 11 and 12 provides insufficient information for determining the location of the hand 14. In other words, any determination as to the location of the hand 15, which is made on the basis of the previously mentioned, vector summing operation, will be inaccurate to the extent that one or both of the arm elements 11 and 12 is or are deformed under load.

Referring next to FIG. 3 of the drawing, a robot arm device 20 may be employed to handle an article while determining its position independently of any load-caused deformation of the component elements of the robot arm 20, namely a first arm element 21 and a second arm element 22. The two arm elements 21 and 22 are interconnected by a pivotal joint 23. The first arm element 21 terminates at its free end 24 in a hand 25 for supporting an article, while the second arm element 22 is mounted at its free end 26, i.e., the end 26 of second arm element 22 remote from the pivotal joint 23, e.g., on a frame or wall structure 27. The article supported by the hand 25 of the robot arm 20 may, for example, be either a workpiece or a tool for engaging and machining a workpiece. A mechanism for manipulating the robot arm 20, so as to displace the hand 25 to vary the position of the article, is represented in FIG. 3 by a motor 28.

The robot arm 20, as described thus far, is similar to the previously described, prior art, robot arm 10. Robot arm 20 differs, however, from robot arm 10 in that robot arm 20 also includes a first linking element 31 and a second linking element 32, both having known lengths. The two linking elements 31 and 32 are interconnected, at one end of each, by a pivotal joint 33. The pivotal joint 33 is free-floating; i.e., the pivotal joint 33 is not mounted on any component of the robot arm 20 other than the two linking elements 31 and 32 and is, thus, free to move independently of the pivotal joint 23. The first linking element 31 is pivotally coupled at its free end 34, e.g., by a pivot pin 35, to the hand 25 of robot arm 20, while the second linking element 32 is pivotally mounted at its free end 36, i.e., at the end 36 of second linking element 32 remote from the pivotal joint 33, e.g., on a pivot pin 37. The pivot pin 37 may be located adjacent to the wall 27 and to the end 26 of the second arm element 22, in a known position. A pair of sensor devices 39 and 39', e.g., two potentiometers, are mounted at the pivotal joint 33 and the pivot pin 37, respectively. The sensor devices 39 and 39' serve to measure respective angles $\beta_1$ and $\beta_2$, angle $\beta_1$ being defined by the linking elements 31 and 32 at the pivotal joint 33, and angle $\beta_2$ being defined by the second linking element 32 and a reference line, e.g., a vertical line in the plane of the wall 27.

Turning now to FIG. 4 of the drawing, the effect of a load upon the hand 25, e.g., due to the weight of an article supported by the hand 25, may be seen. One or both of the arm elements 21 and 22 will tend to bend or deform under the load, in similar manner to the tendency of the arm elements 11 and 12 of the previously described, prior art, robot arm 10 to bend or deform under a load. The linking elements 31 and 32 are, however, free of any load caused by forces upon the hand 25 of the robot arm 20, such load-free condition resulting from the free-floating nature of the pivotal joint 33. Thus, there is no tendency for the linking elements 31 and 32 to deform upon loading of the hand 25. Accordingly, each determination as to the location of the hand 25, and the location of an article supported in the hand 25, on the basis of a vector summing operation using data obtained from the sensor devices 39 and 39', will be independent of any load upon the hand 25. Thus, the determination will be accurate whether or not the hand 25 carries a load, and irrespective of the extent of any such load. As a result, the manipulation of the robot arm 20 in such manner as to transport a workpiece or tool supported in the hand 25 toward and into a desired position, by operation of the motor 28, may readily be controlled in response to measurements taken by the sensor devices 39 and 39'.

It is to be understood that the described methods and apparatus are simply illustrative of a preferred embodiment of the invention. Alternative embodiments might, for example, incorporate more than two arm elements and/or more than two linking elements. Moreover, the linking element remote from the hand of the robot arm might be pivotally coupled to a known position other than a position adjacent to the mounted end of the robot arm. Many other modifications may, of course, be made in accordance with the principles of the invention.

What is claimed is:

1. A method of handling an article by means of a robot arm, the robot arm terminating at one end thereof in a hand while being mounted at the other end thereof, while also monitoring the location of the article being handled, comprising the steps of:
   (a) supporting the article in the hand of the robot arm, a load from the article supported in said hand tending to cause deformation of the robot arm; while
   (b) providing a plurality of interconnected linking elements of known lengths, one of which linking elements is pivotally coupled at a free end thereof to the hand of the robot arm, and another of which linking elements is pivotally coupled at a free end thereof to a known position, the linking elements being free of any load from the article and, thus, not subject to deformation caused by such a load; and while
   (c) measuring both the relationship between adjacent interconnected linking elements and the attitude of said other linking element at said known position to determine the location of the article supported in the hand of the robot arm.

2. A method as set forth in claim 1, wherein step (b) further comprises:
   (d) providing first and second linking elements, interconnected by a single pivotal joint, the first and second linking elements constituting, respectively, said one linking element and said other linking element.

3. A method as set forth in claim 1, wherein said article is a workpiece and wherein the workpiece is to be moved into a desired position thereof, the method further comprising:
   (d) so moving the robot arm as to transport the workpiece toward said desired position thereof; while
   (e) continuously utilizing the measurements obtained in step (c) to control the movements of the workpiece toward said desired position thereof, until said desired position is attained.

4. A method as set forth in claim 1, wherein said article is a tool and wherein the tool is to be moved into a desired, workpiece-engaging position thereof, the method further comprising:
(d) so moving the robot arm as to transport the tool toward said desired, workpiece-engaging position thereof; while
(e) continuously utilizing the measurements obtained in step (c) to control the movements of the tool toward said desired, workpiece-engaging position thereof, until said desired, workpiece-engaging position is attained.

5. A device for handling an article while monitoring the location of the article being handled, the device comprising:
a robot arm terminating at one end thereof in a hand for supporting the article;
first means for mounting an end of the robot arm remote from said hand;
a plurality of linking elements of known lengths;
linking means for so interconnecting said plurality of linking elements as to form an open-ended linkage;
second means for pivotally coupling one end of said linkage to the hand of the robot arm;
third means for pivotally coupling the other end of the linkage to a known position, said second and third means so cooperating that the linkage does not bear any load from the article supported in the hand of the robot arm;
fourth means for measuring the relationship between adjacent, interconnected linking elements; and
fifth means for measuring the attitude of said other end of the linkage at said known position.

6. A device as set forth in claim 5, wherein said linking elements are two in number, and said linking means constitute a single pivotal joint interconnecting the two linking elements.

7. In combination with the device of claim 5:
sixth means, effective during the operation of said fourth and fifth means and under continuous control from said fourth and fifth means, for so moving the hand of the robot arm as to displace the article toward and into a desired position of the article.

8. A combination as set forth in claim 7, wherein said article is a tool and said sixth means
is effective for so moving the hand of the robot arm as to displace the tool toward and into a desired, workpiece-engaging position of the tool.

* * * * *